United States Patent Office

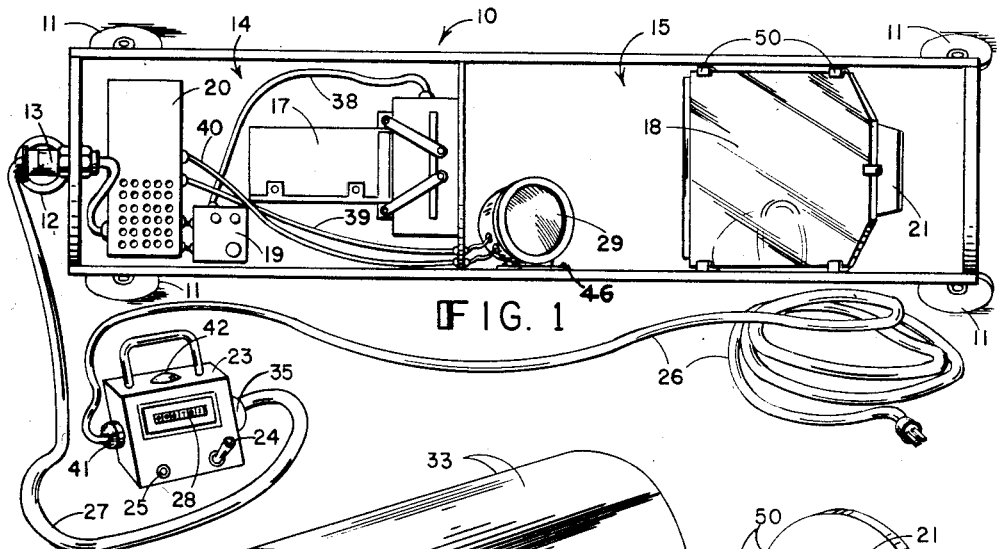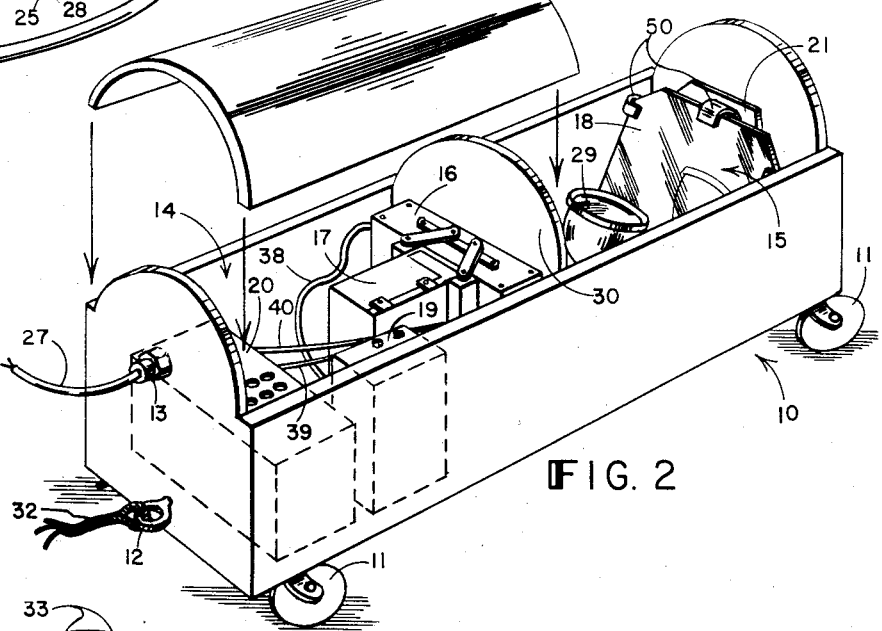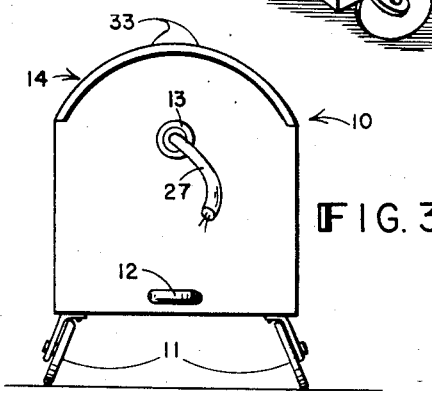

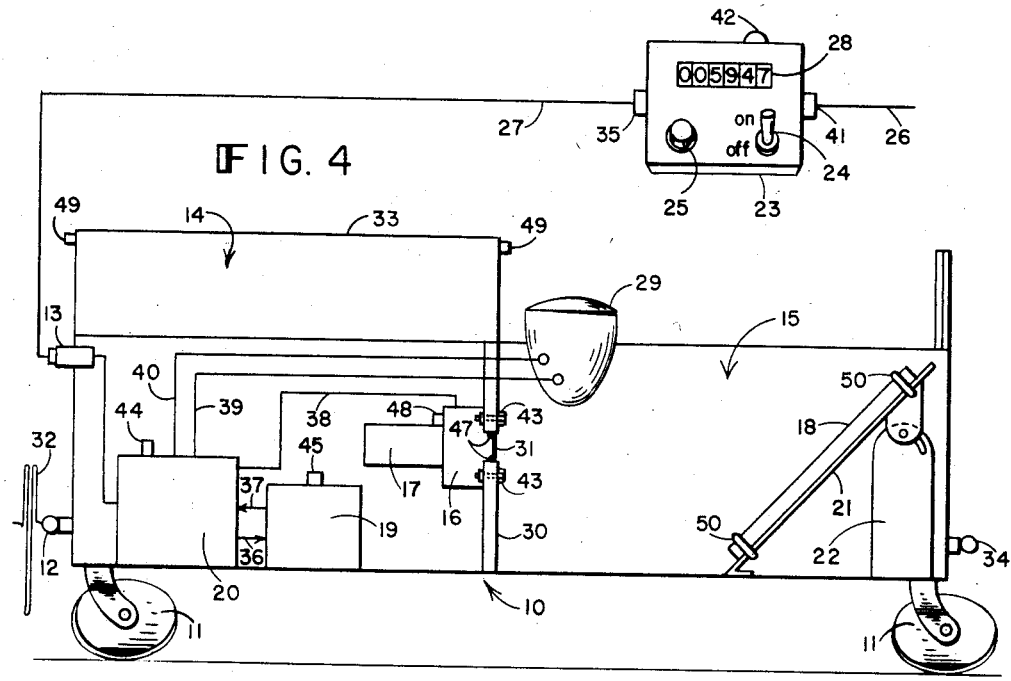
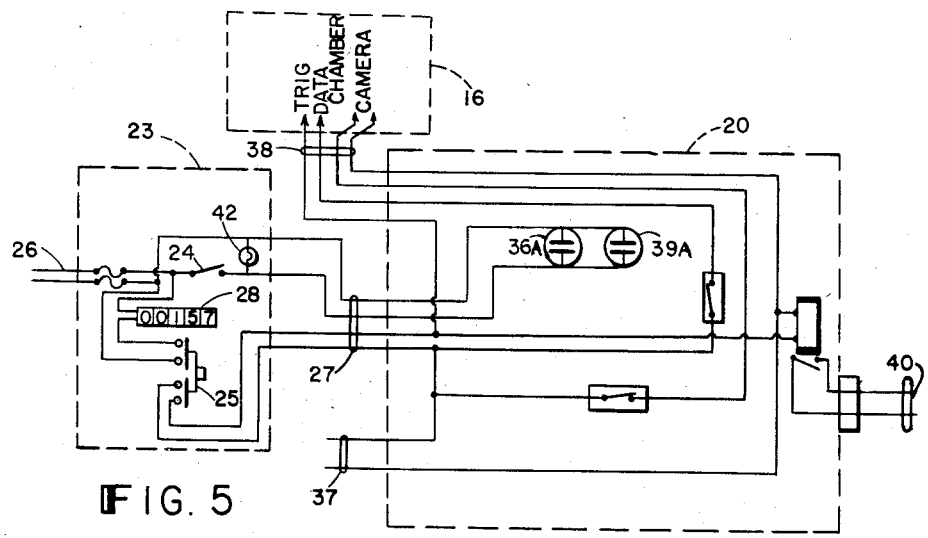

2,932,243
Patented Apr. 12, 1960

2,932,243

MOBILE CAMERA FOR LATERAL UNDERGROUND SUBWAY SURVEYING AND RECORDING

Malcolm Woronoff, Boston, Mass.

Application May 28, 1957, Serial No. 662,149

3 Claims. (Cl. 95—11.5)

This invention relates to mobile photographic systems and particularly those for photographing at close range the interior surfaces of lateral pipes, conduits, sewers, drains, subways and the like primarily designed for sewer and water.

In the past such survey work was performed by reflecting the rays of the sun by means of angle mirrors into the manhole and thence into the lateral run where an observer could observe from the manhole the straightaway portion of the pipe as far as the light would carry. As the interior surfaces are all important, this viewing was unsatisfactory due to change in perspective and to the distance from the observer. More recently photography has been used. As actual location of a pipe fissure or partial collapse of the pipe is essential for practical use of such surveys, such photography being confined to pictures taken from manholes and catch basins in which the results were limited to a comparatively short shot into the subway, have not been satisfactory. There has been a requirement for a device which would travel through the bore, take pictures at close range, at prescribed intervals, record specified distances so that results could be pieced together to provide an authentic picture of the interior condition of the subway system without digging up the highways to physically uncover the underground structure. Such operations are often necessary to quickly and accurately locate leaks due to cracks in the structure or poor joints between sections. Surveys of condition to determine maintenance requirements and costs can easily and accurately be made with this equipment.

It is accordingly an object of this invention to provide, as one embodiment a mobile camera device which can be drawn through a section of lateral subway, by a succession of pulls of equal length, say a foot at a time, take a picture at each station together with a registered record of the actual distance travelled from the starting manhole, on a continuous roll of film to provide a matched authentic photographic record of physical conditions inside of the pipe.

In accordance with my invention there is provided mobile camera apparatus that provides suitable equipment for penetrating and photographically surveying and recording the interior condition of horizontal apertures inaccessible to human beings. It may be operated by one man. It can be used while subway is flowing with a normal amount of fluid without the costly expense and time required to block off the flow, or reroute it, as well as in a dry subway. On each film frame there is exposed a description of the location of photograph in terms of feet in from starting manhole. As the camera photographs the top of the subway at close range, it shows up even the smallest hairline cracks which would be missed by a camera shooting from any other angle. A complete mosaic of photographs can be assembled of the entire length of the subway revealing all imperfections in continuous alignment. It provides a carrier which is characterized by little or no axial rotation while being advanced during the survey. It can be positioned on a wheeled carrier or mounted on float adapted to travel in alignment with the cross section of the subway in which it is operating.

Further objects of the invention will hereinafter appear from the following description of a preferred embodiment illustrative of the invention and shown in the accompanying drawings in which Fig. 1 is a plan view of the carrier.
Fig. 2 is a side view in perspective of Fig. 1.
Fig. 3 is an end view of Fig. 1.
Fig. 4 is a diagrammatic view showing the position and wiring of the component parts.
Fig. 5 is the wiring diagram.

Referring to the drawings, the unit therein shown as one embodiment of my invention comprises a carrier outer housing 10, consisting of two sections separated by a partition 30, a fluid-tight section 14, and an open section 15. The carrier 10, when pulled by an operator by means of cable 32, attached to carrier 10, by ring 12, through a dry or partially filled fluid subway, motivates on four wheels 11. Electrical connections and remote tripping are accomplished by power conducted through cable 27, attached to master control 23. The section 14 is enclosed and contains a data recording camera 16, film magazine 17, junction box 20, and power rectifier 19. The section 15, is open and contains an open section containing a fluid-tight electronic flash lamp, power supply and reflector, all in a self contained unit 29, and front surface mirror 18. The carrier 10, is connected to pulling cable 32 and power cable 27 which has previously been snaked through subway from one manhole or similar opening to next adjacent manhole. One operator can control entire operation from street level at the terminal manhole by advancing carrier 10, towards him in one foot intervals. This is easily accomplished by means of pulling on cable 32, marked off at one foot increments by any suitable tag, label or marker. The body of the carrier 10, is preferably separated by a partition 30, into two sections, one being a fluid-tight section 14, which is made fluid-tight by securing the cover 33 to it by means of two screws 49, and an open section 15. Within section 14 there is a junction box 20, secured in place by bracket 44, and connected to power rectifier 19, by two two-conductor cables 36, 37. Junction box 20, is also connected to camera 16, by one four-conductor cable 38, and is also connected to electronic flash lamp by two conductor cable 39, for power through jack 39A, and two conductor cable 40, for tripping the flash in synchronization with camera. The power rectifier 19, is secured in section 14, by means of bracket 45. One of the two conductor cables 36, which connects power rectifier 19, to junction box 20, through jack 36A, supplies power rectifier 19, with 110 volts A.C. power. The other two conductor cable 37, supplies junction box 20, with 28 volts D.C. power from power rectifier 19. The camera 16, is secured to partition 30, by four screws 43, and photographs through partition 30, by means of glass port-hole 31, secured in bulkhead by retaining ring 47. The camera 16, receives its power from junction box 20, by means of a four conductor cable 38, of which one conductor supplies camera with +28 v. D.C. power, one conductor supplies camera with +28 v. D.C. pulse for tripping, a third conductor supplies the camera data chamber with +28 v. D.C. for illumination of the two data chamber lamps contained therein, and a fourth conductor supplies the camera with its —28 v. D.C. The camera used is a commercial type of data recording camera such as the Fairchild O-15 Data Recording Camera. This camera contains a data recording chamber illuminated by two 14 volt lamps in series. Within the data recording chamber is a slate on which one can enter pertinent data such as date, the numbers of the manholes between which a photographic survey is being conducted, and the name of the city or town for which the survey is being conducted. Also there is a digital counter which automatically advances each time a photograph is exposed. Both the slate and the counter are exposed on the frame of the film simultaneously with the electronic flash illuminated section of the subway. The film magazine 17, contains 100′ of 35 mm. film capable of making 1600 frames or exposures without reloading. The film magazine 17 is secured to camera body 16, by means of two clamps 48. The electronic flash 29, is secured in section 15 by bracket 46, having its lamp, power supply and reflector all positioned within a fluid-tight self contained unit. It receives its operating power, 110 v. A.C. power from the junction box 20, through cable 39, and is tripped in synchronization with the camera shutter by means of cable 40. The front surface mirror 18, is secured to mirror mount 21, by four clamps 50 and held in position at a designated angle by brackets 22. Mirror 18, is coated with any commercially available silicone glass cleaner or polish to help retard the formation of moisture from its reflecting surface and also to enable any fluids to roll off its surface. The area to be photographed is reflected and deflected by means of the mirror 18 to the lens of the camera 16. The master control 23, consists of a chassis in which there is a double two pole self-restoring switch 25, a pilot lamp 42, a master power switch 24, and a resettable magnetically advanced digital counter 28. The master control 23, receives its 110 v. A.C. power from the two conductor cable 26, by means of connector 41. Before commencing the survey both the digital counter 28 on the master control 23, and the counter in the data recording chamber of the camera 16, are reset to zero. The power switch 24 is then thrown to "On" and the exposure switch 25, is depressed momentarily. The camera shutter is thus tripped and the electronic flash is fired in perfect synchronization. Also through a completely different optical system a simultaneous photograph of the data chamber is recorded on the same frame of film. After the shutter is tripped the film automatically advances one frame and both counters advance one digit for each frame tripped off. In operation, after the counter in both the camera's data recording chamber and the counter on the master control are reset to zero, a loaded film magazine 17 is secured to the camera 16, by clamps 48. The fluid-tight cover 33 is then secured in place by two screws 49, and the entire carrier 10, is lowered into the manhole or other suitable entrance, and cables 27, and 32, are connected to carrier 10 by connections 13, 12, respectively. The entire carrier is placed in the subway so that the angled mirror 18, is one foot in from the manhole and reflects an image from the top of the subway. The operator then goes to the street level of the adjacent manhole and turns the master power switch 24, of the master control 23, to "On." He then presses the self restoring switch 25, the action of which trips the camera and the electronic flash in synchronization, the data in the recording chamber being simultaneously exposed on the same frame of film, giving pertinent data e.g., the numeral 0001 on the counter representing one foot in from the starting manhole, and a slate on which is recorded the name of the city or town for which the survey is being conducted, the date on which the survey is being conducted, and the numbers of the two manholes between which the survey is being conducted. After each exposure the film is then advanced automatically to the next frame of film and is ready for the next exposure. The operator then advances the carrier 10 one foot and presses the exposure button 25. This operation is repeated until the entire section of the subway has been photographed, frame by frame with the associated data thereon.

The 110 volt A.C. supply cable 27 is removably attached one one end to the carrier 10 by connector 13 and on the other end by connector 35. On the rear end of the carrier 10 a rescue hook 34 is provided with an attached line so that the carrier may be withdrawn in the event that any unexpected obstacles are encountered. As most subways of this type have a rounded bottom, the wheels 11 may be set at an outwardly extending angle in order to increase the stability of the carrier.

While the preferred embodiment of my invention has been described in detail, it will be understood that I do not wish to be limited to the particular construction set forth, since various changes in the form, material, proportions and arrangements of parts and in the details of construction may be resorted to without departing from the spirit and scope of the invention, or destroying any of the advantages contained in the same, heretofore described and defined in the following claims.

I claim:

1. A mobile camera apparatus for lateral underground pipe photographic surveying and recording, comprising a master control box, a power supply, a floatable carrier to house and to position recording photographic equipment within said pipe and traction and power supply cabling between said control box and said carrier to provide progressive aligned travel for said carrier at equal predetermined intervals and to energize said equipment; said control box having a master power switch, a digital counter and an operating switch; said carrier having a fluid-tight section and an open section separated by a vertical transverse partition; said fluid-tight section fixedly housing a data recording camera having a continuous roll of film, an interior data slate and a digital counter; said camera being secured to said partition, the outer lens of said camera registering with a glass porthole in said partition through which exposures are made; said open section having an electronic flash beamed upwardly and a mirror positioned transversely and obliquely with respect to the top of the interior roof of said pipe; an image of a special predetermined area of the interior roof of said pipe to be photographed being reflected and deflected by said mirror to said lens, the size of said area to be photographed being regulated by the length of each interval of lateral travel of said camera and carrier so that successive identified photographs laterally pieced together can form a continuous straight line undistorted authentic picture of the interior roof of said pipe.

2. The apparatus of claim 1 wherein said traction cable is marked at equal predetermined increments corresponding with the setting of said digital counter in said recording camera data chamber and also with the setting of said digital counter in said control box.

3. The apparatus of claim 1 wherein said operating switch, digital counter, data recording camera, and electronic flash are wired so that operation of said switch trips the shutter of said camera and fires said electronic flash in synchronization, operates the digital counter in the data chamber of said camera, operates the digital counter in said control box and advances the film one frame.

References Cited in the file of this patent

UNITED STATES PATENTS

| | | |
|---|---|---|
| 1,912,485 | Kothny | June 6, 1933 |
| 2,730,936 | Fagan | Jan 7, 1956 |
| 2,737,864 | Gutterman | Mar. 11, 1956 |

FOREIGN PATENTS

| | | |
|---|---|---|
| 839,142 | Germany | May 15, 1952 |